US012670087B2

(12) United States Patent
Hazarika et al.

(10) Patent No.: US 12,670,087 B2
(45) Date of Patent: Jun. 30, 2026

(54) SYSTEMS AND/OR METHODS FOR AUTOMATICALLY DERIVING AND EXECUTING COMPUTER TEST SCRIPTS

(71) Applicant: SOFTWARE AG, Darmstadt (DE)

(72) Inventors: Rinku Moni Hazarika, Bangalore (IN); Prakashgouda Channagoudra, Bangalore (IN)

(73) Assignee: SOFTWARE GMBH, Darmstadt (DE)

( * ) Notice: Subject to any disclaimer, the term of this patent is extended or adjusted under 35 U.S.C. 154(b) by 286 days.

(21) Appl. No.: 18/659,637

(22) Filed: May 9, 2024

(65) Prior Publication Data

US 2025/0348414 A1 Nov. 13, 2025

(51) Int. Cl.
*G06F 11/3668* (2025.01)
(52) U.S. Cl.
CPC ................................. *G06F 11/3684* (2013.01)
(58) Field of Classification Search
None
See application file for complete search history.

(56) References Cited

U.S. PATENT DOCUMENTS

| | | | | |
|---|---|---|---|---|
| 2019/0384593 A1* | 12/2019 | Michiyama | ............. | G06F 21/64 |
| 2021/0216442 A1* | 7/2021 | Bhadani | ............. | G06F 11/3684 |
| 2023/0072003 A1* | 3/2023 | Yuan | .................... | G06F 16/2456 |
| 2024/0037243 A1* | 2/2024 | Sylvester | .............. | G06F 21/577 |
| 2025/0045190 A1* | 2/2025 | Chen | .................... | G06F 11/3684 |
| 2025/0130884 A1* | 4/2025 | Wong | .................... | G06N 3/0455 |

OTHER PUBLICATIONS https://aqua-cloud.io/ Test Management with AI: Make testing faster than humanly possible; retrieved May 9, 2024, 14 pages.
Https://www.mabl.com/ Mobile App Testing Meets AI; A Approach to Software Quality; retrieved May 9, 2024, 10 pages.
Https://www.testim.io/ Tricentis Testim; Move faster and reduce costs with the power of AI; retrieved May 9, 2024, 9 pages.
Https://platform.openai.com/docs/guides/embeddings Embessings; Learn how to turn text into numbers, unlocking use cases like search; retrieved May 9, 2024, 6 pages.
Https://www.selenium dey/documentation/webdriver/ Selenium; WebDriver drives a browser natively; learn more about it; Mar. 29, 2024, 5 pages.

* cited by examiner

*Primary Examiner* — Toan H Vu
(74) *Attorney, Agent, or Firm* — Nixon & Vanderhye PC

(57) ABSTRACT

Certain example embodiments herein relate to techniques that help automatically derive test scripts based on incidents reported using a trouble ticket reporting system or the like. Information is extracted from a support incident report related to an underlying incident reported via a ticket system. The extracted information includes one or more elements of a computer-implemented product implicated by the underlying incident and a category of incident. A test case is generated based thereon. If there is no test matching the generated test case already existing in a test repository, a new test based on the test case is generated using a generative artificial intelligence (AI) model, and the generated new test is stored to the test repository. Responsive to a developer fix being committed, one or more tests relevant to the developer fix is/are automatically identified and automatically executed.

22 Claims, 6 Drawing Sheets

```
llm = AzureChatOpenAI(
    deployment_name="gpt35", model_name="gpt-35-turbo",
temperature="0.2"
)

retrieval_chain = RetrievalQA.from_chain_type(
    llm, chain_type="stuff", retriever=vectorDB_si.as_retriever()
)

incidents_folder = "C:\Gen_AI_Demos\si_report_itrac\incidents_extract"
summary_folder = "C:\Gen_AI_Demos\si_report_itrac\incidents_summary"

report = []

def genReport():
    for filename in os.listdir(incidents_folder):
        file_path = os.path.join(incidents_folder, filename)
        with open(file_path, "r") as file:
            data = json.load(file)
            incident = data["incident"]
            description = data["description"]
            title = data["title"]
            type = data["type"]
            product = data["product"]
            version = data["version"]
            customer = data["customer"]

summary = analyzeSI(incident, title, description)
        new_row = {
            "Support Incident": incident,
            "Title": title,
            "Incident Type": type,
            "Product": product,
            "Version": version,
            "Customer": customer,
            "Summary": summary,
        }
        report.append(new_row)
        output_filename = incident + "_summary" + ".txt"
        output_filepath = os.path.join(summary_folder, output_filename)
        with open(output_filepath, "w") as file:
            file.write(incident + ":" + title + "\n" + summary)
    return report
```

Fig. 4A

```
def persistToChromaDB():
    print("Persisting data to chroma DB...")
    isExist = os.path.exists(persist_directory)
    if isExist:
      shutil.rmtree(persist_directory)

loader = DirectoryLoader('docs', glob='**/*.pdf')
    docs = loader.load()

char_text_splitter = CharacterTextSplitter(chunk_size=1000,
chunk_overlap=0)
    doc_texts = char_text_splitter.split_documents(docs)

Chroma.from_documents(doc_texts,
openAI_embeddings,persist_directory=persist_directory)
```

Fig. 4B

```
def analyzeSI(incident, title, description):
    prompt = PromptTemplate(
        input_variables=["si", "title", "description"],
        # input_variables=["discussion"],
        # template="""You have the data about the support incident:
{si}-{title} with the description: {description}.
        # The data provides the reported problem, customer-support
conversation, resolution, and other relevant details.
        # Analyze the data and carefully considering every detail to
generate a comprehensive summary for the support incident.
        # The summary must say how the problem reported in the support
incident affects the customer's business if not resolved soon,
        # actionable insights for the support team to reduce such
incidents in the future. The summary must be solely generated using
        # the provided incident details and not generic data. Do not
mention the customer or support personnel names in the summary.
        # """,
        template="""You are a professional support incident analyst with
expert knowledge in generating comprehensive summaries.
        Your task is to analyze the provided data about the support
incident with the title "{si}-{title}" and description "{description}".
        Using this information, you need to generate a summary that
includes the following:
        1. Describe how the problem reported in the support incident
will affect the customer's business if it is not resolved soon.
        2. Provide actionable insights for the support team to help
reduce such incidents in the future. Also, how the team could
        reduce the time taken to resolve such incidents.
        Ensure that your summary is solely based on the provided
incident details and does not include any generic information or
        mention any names of customers or support personnel.""",
    )
    start_time = time.time()
    print("started...")
    res = retrieval_chain(
        prompt.format(si=incident, title=title, description=description)
        # prompt.format(discussion=comment_thread)
    )
    print("Done...")
    end_time = time.time()
    print(
        "Response generated in: "
        + str(round((end_time - start_time) / 60))
        + " minutes"
    )
    summary = res["result"]
    print(summary)
    return summary
```

Fig. 5

SYSTEMS AND/OR METHODS FOR AUTOMATICALLY DERIVING AND EXECUTING COMPUTER TEST SCRIPTS

TECHNICAL FIELD

Certain example embodiments described herein relate to computer tools used in automatically deriving test scripts. More particularly, certain example embodiments described herein relate to systems and/or methods that help automatically derive test scripts based on incidents reported using a trouble ticket reporting system or the like.

BACKGROUND AND SUMMARY

Computer-related tools are used practically everywhere in today's society, from embedded systems used in factories, to ecommerce platforms that make use of online shipping and tracking systems, to medical diagnostics systems, to video games, and beyond. It will be appreciated that computer-related tools might be "mission critical" for an organization and/or user of the tool. For example, a car driver, knowingly or unknowingly, interfaces with a host of on-board computer systems—and a city's traffic lights might be coordinated by computer systems. Air travel of course depends on computer-related systems to manage both air traffic and the airplanes themselves, including for flight control, onboard entertainment, etc. These are just a few of the ways that we interact with computer-related tools in our everyday lives.

Computer-related tools are based on code from developers, and the code is subjected to tests to help ensure that it will work properly once deployed. The testing oftentimes is based on test scripts written by test code developers or quality assurance specialists. Test scripts frequently are executed within a test framework prior to the code being deployed to try to test for problems that might arise during actual post-deployment operation. If problems are found, developers can try to address them early on in the development cycle, or at least prior to code deployment. Some problems may be addressed post-deployment, e.g., if they are minor in nature. Generally speaking, the goal typically is to deploy the best product possible at the outset so that users will have a positive experience, functionality will perform as expected, etc.

Unfortunately, deployed code is not always "perfect." Sometimes the deployed code includes bugs, users uncover performance or other issues as they begin to use the tools in ways that were not expected, code vulnerabilities become manifest, and/or other problems arise. Other times, users may encounter difficulties or frustrations because, for example a tool is missing a desired feature, a feature that is provided suddenly stops working, a feature is being used incorrectly, user error, a user is trying to get a tool to perform a task for which it was not designed and/or cannot accommodate, a backend system upon which the tool relies experiences an availability or other issue, etc. These kinds of problems may become more prevalent as new versions of a product are released or when there is a code update.

Problems with computer-related tools may be reported, directly or indirectly, to the organization responsible for generating them. Oftentimes, problems will be reported through a telephone call, via online feedback, automated reporting system, using a chat bot, or the like. A reported problem may be thought of as being a "support incident," and frequently support incidents are handled via a ticket system. A "trouble ticket" or the like will be opened for the support incident, and basic information will be associated with the ticket. Basic information may include the identity of user experiencing the support incident, time and/or date associated with the incident and/or the report of the incident, a description of the incident, etc. Some ticket systems support prioritization, e.g., based on severity of the incident, the number of times the incident has been reported by the same or different users, the system(s) implicated, etc.

Tickets can be assigned to developers or other support personnel for handling. Sometimes, the users on whose behalf the support tickets were opened may be kept abreast of any progress being made in resolving the tickets (e.g., through text, email, and/or other alerts) or by manually checking for updates via a web portal or the like. Other times, a user will only be notified once a ticket is closed (which sometimes, but not always, means that the problem has been resolved). In still other cases, a user may not get any updates at all.

Many organizations oftentimes encounter difficulties responding to and resolving support incidents, including when ticket systems are implemented. To try to help ease the burden of responding to and resolving support incidents, an organization may engage in "support triaging." Support triaging generally involves accessing details of the support incident from the ticket system. Once accessed, support team personnel can obtain support incident details, a summary of the issue, comments made by the user who encountered the support incident and/or a customer support person who interfaces with the user who encountered the support incident, fix details, etc.

Support personnel will try to identify the type of issue associated with the ticketed support incident. Doing so might include trying to pin down whether the issue pertains to functionality of a tool, integration with one or more other systems, performance, reliability, user interface and/or user experience, infrastructure, configuration, and/or the like. Doing so might also involve trying to identify the product, component, sub-components, or other aspects implicated by (e.g., affected by and/or having an effect on) the support incident.

The test environment might already include tests relevant to the situation. Thus, support personnel might try to identify and run tests to try to diagnose the problem or test solutions. For example, if a server went down and is now back up, tests may be run to confirm that the server is functioning as expected once again. As another example, if a configuration file is determined to be corrupted, it can be restored, and tests can be run to verify that the tool is operating as expected.

If the test environment does not already cover the support incident, support personnel might try to generate scenarios or test cases to validate the problem and test solutions. Once generated, the scenarios or test cases may be automated and implemented in trying to resolve the problem.

Unfortunately, there are technical problems with this overall approach. The investigative and remedial processes do not scale well because most of the support triaging operations require manual work, e.g., in gathering details, analyzing them, deciding which tests to run, and taking other follow-up actions. As tools become more complex (e.g., because tools grow in scope, more complicated technology integrations are made, etc.), the manual effort and skill level required to develop new tests and fixes increases as well. Manual analysis can lead to delays in analyzing support incidents and, in turn, delays in defining new tests to add to the test framework when there are problems for which existing tests do not exist. Support personnel can find the generation of new tests time intensive and tedious and, again, a high level of domain- and/or component-specific knowledge may be needed to develop those tests. Over time, the manual nature of the tasks to be performed can lead to incorrect or inconsistent outcomes. Even when manual support incident analysis is completed, tests and test scripts may not be generated by the time a developer fix is ready for validation and/or deployment.

For many organizations, it is very important to understand and answer the queries of users quickly. Doing so can help the organizations maintain user confidence. Generally, the quicker the response, the higher the user's confidence remains. In some cases, e.g., where mission critical applications are involved, responding to user problems may be significantly more important. Indeed, it is not an exaggeration to say that the failure to timely respond to a reported support incident might result in a failure to shut down a dangerous process in a factory, a power disruption, a hold on the transfer of data to an important system, etc.

From a user-facing perspective, it would be beneficial to elevate the user experience by identifying and eliminating problems with computer-based tools and preventing their recurrence. From a technical perspective, it would be desirable to improve existing tools used in handling support incidents so that problems can be diagnosed more quickly and reliably, and so that tests can be generated consistently and reliably in a timely manner, so that code can be validated and deployed in response to those support incidents. Overall, the technical desire is to reduce support incident rates by improving test coverage and through test optimization, thereby increasing the robustness of the computer-based tools. It would be desirable to do so on a consistent basis, regardless of the issue or the particular user involved.

Certain example embodiments help address the above-described and/or other concerns. For example, certain example embodiments relate to computer tools that aid in analyzing support incidents to help support teams and/or developers reply to user issues quickly and precisely, develop novel tests responsive to specific reported support incidents, and deploy effective code fixes quickly. The tools of certain example embodiments reduce manual tasks involved with typical ticket systems and support incident triaging.

An aspect of certain example embodiment relates to improvements to support incident analysis tools in the sense that, for example, those tools become more automated. In this regard, the amount of manual intervention required is reduced, as is the propensity for human error and inconsistencies. The overall cycle time for support incident analysis is reduced.

Another aspect of certain example embodiments relates to the use of artificial intelligence (AI) in helping the tool to learn and generate effective tests or test scripts over time.

Advantageously, the tests are developed quickly and automatically, e.g., so that a developer's code or other fix can be tested prior to implementation, thereby further shortening the time to respond, especially for novel support incidents.

Certain example embodiments automatically derive, and potentially automatically implement, tests based on reported support incidents, e.g., where there are novel incidents encountered once a computer-based tool is deployed "in the field." These automatically derived tests can supplement previously-generated tests, including tests generated during original tool development, which typically are based on a priori known or desired system/application requirements. Thus, certain example embodiments advantageously provide a potentially broader array of tests based on "real-world" scenarios encountered in actual use.

In certain example embodiments, it is possible to categorize support incidents into one or more of several categories. For example, support incidents can be categorized as being an issue with one more of functionality, integration, performance, reliability, user interface and/or user experience, infrastructure, configuration, and/or the like etc. Thus, it becomes easier and more intuitive to locate tests that might be relevant to situations encountered. In a related regard, certain example embodiments are able to automatically select a subset of relevant tests for a given problem, e.g., when a developer has developed a fix for a specific support incident.

In certain example embodiments, test requirements are derived from real support incidents, e.g., reported via a user-facing ticket system, with that user-facing ticket system potentially being automated or human operated in whole or in part. As will be appreciated from the description below, an extractor helps appropriately associate incidents with relevant products, components, sub-components, etc., which can further assist in test development and implementation.

In certain example embodiments, a test generation system is provided. The system comprises an electronic interface to a ticket system. At least one processor is configured to perform operations comprising: extracting information from a support incident report related to an underlying support incident reported via the ticket system, the extracted information including one or more elements of a computer-implemented product implicated by the underlying support incident and a category of the support incident; generating a test case based on the extracted information; and generating a new test based on the test case using a generative artificial intelligence (AI) model and storing the generated new test to the test repository. Responsive to a developer fix being committed, one or more tests relevant to the developer fix is/are automatically identified and automatically executed.

According to certain example embodiments, the at least one processor may be further configured to determine whether a test matching the generated test case already exists in a test repository, and the new test may be generated responsive to a determination that there is no test matching the generated test case already existing in the test repository.

According to certain example embodiments, the determination of whether a test matching the generated test case already exists in a test repository may be based on a comparison of titles and summaries of the generated test case and the tests in the test repository.

According to certain example embodiments, the ticket system may be user-facing and/or external to the test generation system.

According to certain example embodiments, the one or more elements of the computer-implemented product may include a component or sub-component of the computer-implemented product.

According to certain example embodiments, the category may be selected from a list comprising at least two of: functionality, integration, performance, reliability, user interface and/or user experience, infrastructure, and configuration.

According to certain example embodiments, the new test may be generated as an automation script. The automation script may be executable in an external test platform, for example.

According to certain example embodiments, the new test, developer fix, and/or support incident report may each have a common identifier associated therewith.

In certain example embodiments, a developer environment is provided. A repository stores code commits. At least one processor is configured to perform operations comprising: receiving information extracted from a support incident report related to an underlying support incident reported via a ticket system, the extracted information including one or more elements of a computer-implemented product implicated by the underlying support incident and a category of the support incident; enabling a developer to write and commit code related to the underlying support incident; and responsive to new code being committed, one or more tests relevant to the new code being committed is/are automatically identified from a test repository and are automatically executed. The test repository is populated by at least some predefined tests and at least some other tests derived from support incident reports.

The developer environment may include or work with other aspects described herein. For example, according to certain example embodiments, the developer environment may work with a ticket system that is user-facing and/or external to the test generation system. As another example, according to certain example embodiments, the new code being committed may have an identifier based on the underlying support incident to which it is related, and the one or more tests relevant to the new code being committed may be identified by virtue of sharing that identifier.

Counterpart methods and non-transitory computer readable storage media also are contemplated herein. The counterpart methods in certain example embodiments include methods for generating tests, executing test scripts, using a developer environment, etc. The counterpart non-transitory computer readable storage media in certain example embodiments store instructions that, when executed, cause a processor to perform operations corresponding to the methods disclosed herein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 4A-4B provide a code snippet that may be used for extracting support incident data, creating a new entry, and storing the newly-created entry to a database, in accordance with certain example embodiments; and FIG. 5 is a code snippet relevant to analyzing support incidents in connection with certain example embodiments.

DETAILED DESCRIPTION

Certain example embodiments provide a tool that improves support incident handling and test generation so that a computer-based product can be fixed more quickly and reliably. In certain example embodiments, a user-facing ticket system gathers details of a support incident. Details about the support incident are analyzed. For example, summary information associated with the support incident is analyzed; the support incident is categorized into one or more different types of support incidents; and the parts affected or implicated by the support incident (e.g., the product(s), component(s), sub-components(s), etc.) are identified. A test case is generated based on these details.

If there is already a test in a test repository of a test framework that is relevant to the newly-generated test case (and thus the support incident), then the already-existing test may be run. If not, a new test script or the like is automatically generated and added to the repository. When a developer is ready to deploy a fix or commit code to a code repository, the relevant test(s) is/are retrieved from the repository and used to validate the fix/commit.

Figure 1:
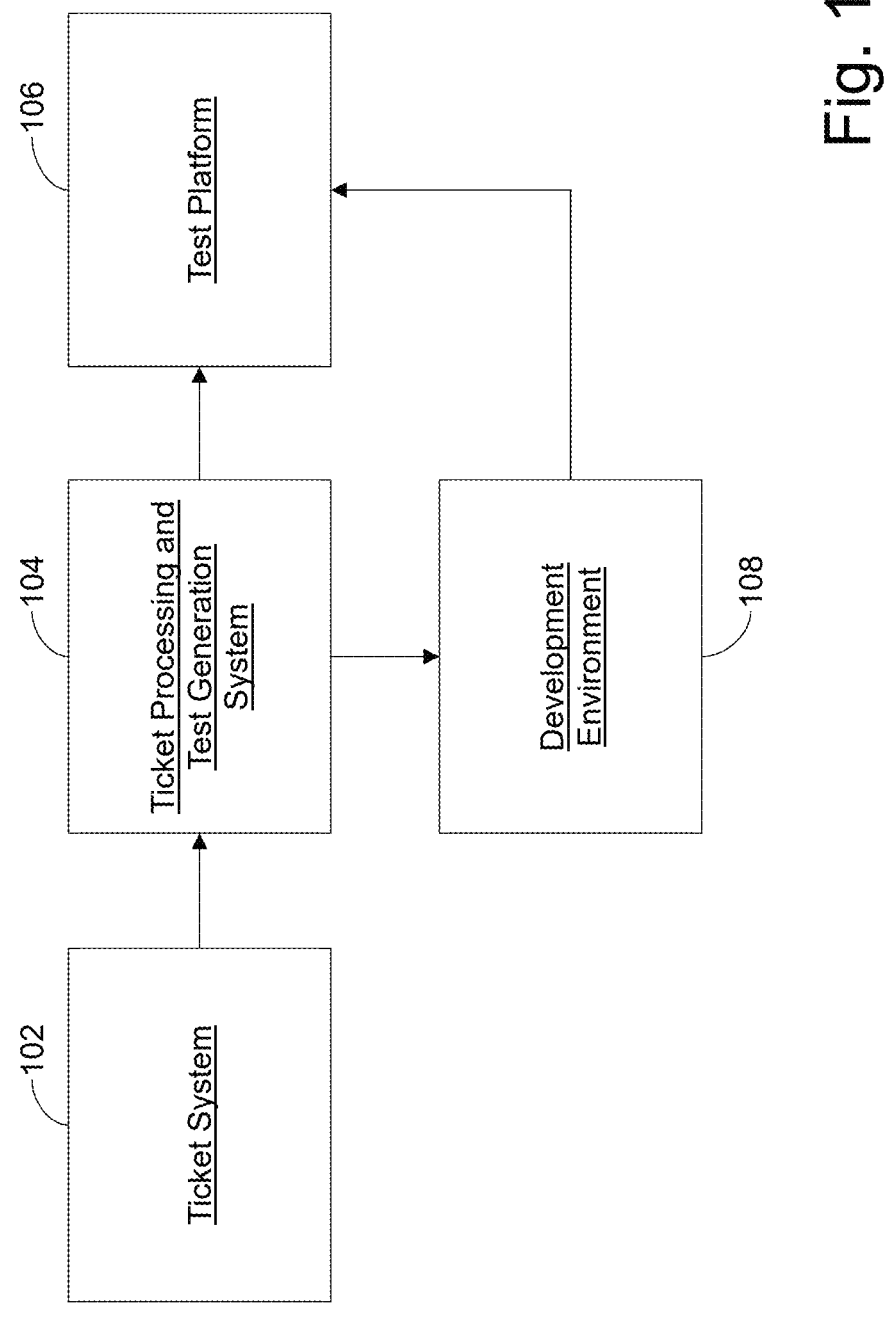
FIG. 1 is a block diagram showing components used in certain example embodiments.

FIG. 1 is a block diagram showing components used in certain example embodiments. As shown in FIG. 1, a ticket system gathers data regarding support incidents and generates tickets. The ticket processing and test generation system 104 receives these tickets/reports of the support incidents and analyzes them. The test platform 106 stores, and is able to run, tests for validating code, including code generated using the development environment 108. The tests in the test platform are updatable based on output from the ticket processing and test generation system 104.

The ticket system 102 may provide a user-facing front end, e.g., via a website, dedicated application, chat bot interface, and/or the like. Thus, the ticket system 102 may include processing resources including one or more processors and a memory. As explained in greater detail below, the ticket system 102 may be integrated with, or external to, the ticket processing and generation system 104.

The ticket processing and generation system 104 likewise may include processing resources including one or more processors and a memory. The processing resources may help run code, computer program modules, and/or the like, corresponding to the extractor, test case generator, and comparator disclosed below. It also may include a facility for training one or more generative AI models, e.g., to assist with extraction, test case generation, script automation, and/or the like. An electronic interface (e.g., a series of application programming interfaces or the like) may be provided to facilitate communications with the ticket system 102.

The test platform also may include processing resources including one or more processors and a memory, together with storge for tests. The tests may be implemented as automation scripts and/or the like, and they may be executed in a test environment.

The developer environment 108 may include processing resources including one or more processors and a memory that receive information extracted from support incident reports, enable a developer to write and commit code related to an underlying support incident, and cause one or more tests relevant to the new code being committed to be automatically identified and automatically executed.

Figure 2:
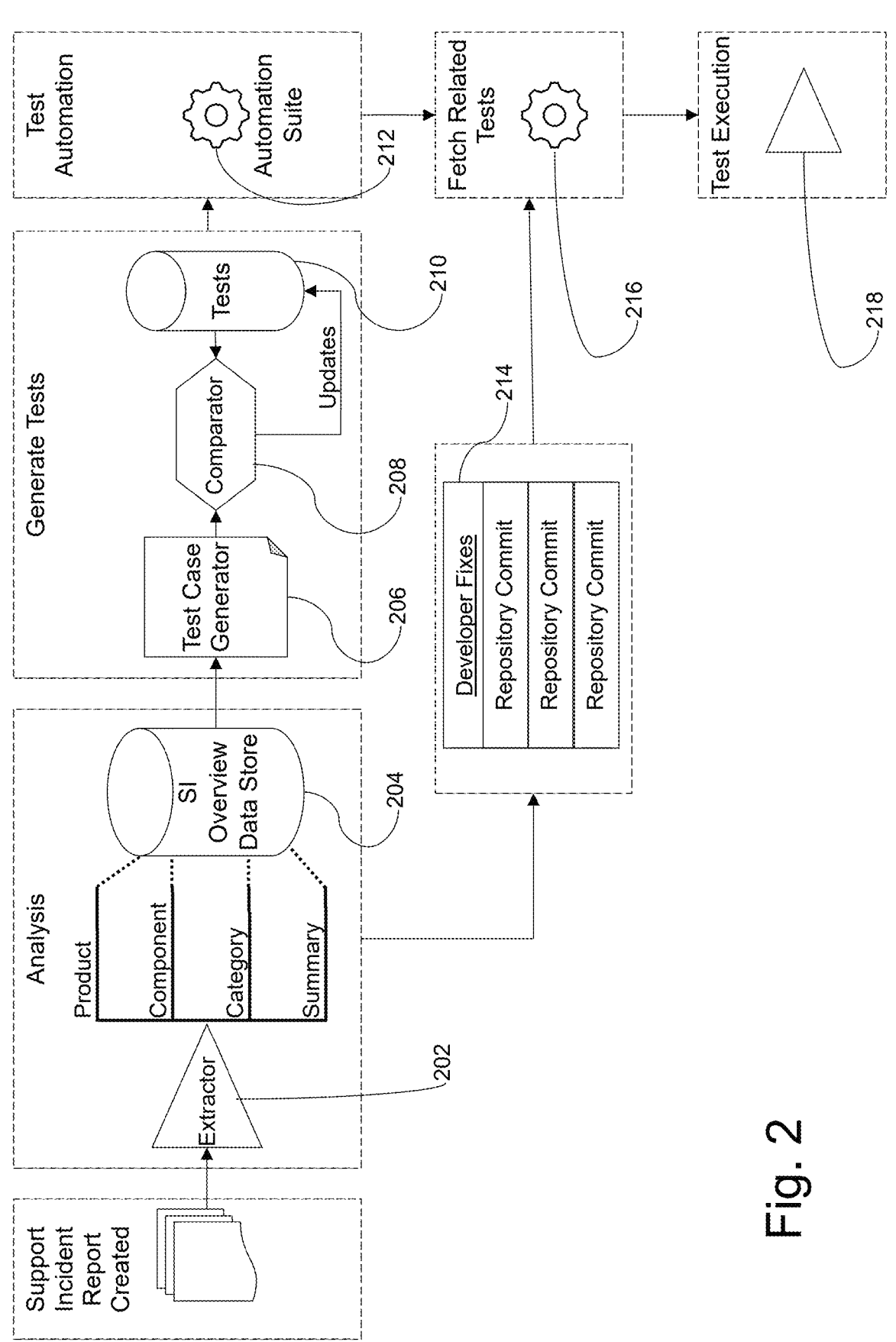
FIG. 2 is a more detailed view of support incident analysis and other components that are used in accordance with certain example embodiments.
Figure 3:
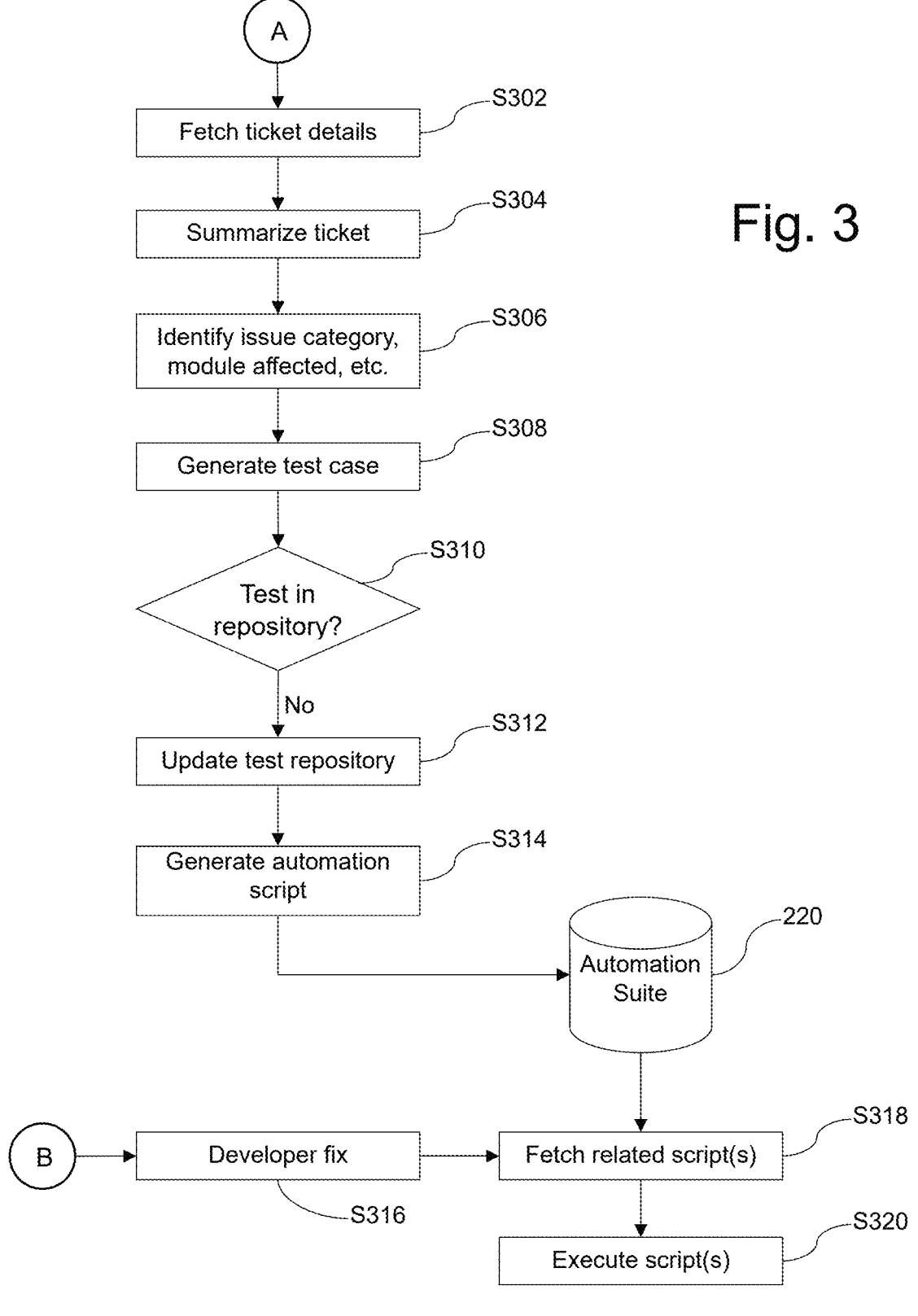
FIG. 3 is a flowchart showing a process for support incident analysis used in connection with certain example embodiments.

Further details will now be provided in connection with FIGS. 2-3. More particularly, FIG. 2 is a more detailed view of support incident analysis and other components that are used in accordance with certain example embodiments.

Example Support Incident Extraction and Analysis

FIG. 2 includes an extractor 202. The extractor 202 is configured to obtain a support incident report from a ticket platform. The ticket platform is configured to generate support incident reports or tickets for support issues reported to it, e.g., from users. That is, the ticket platform is configured to receive input from users or others interacting with or having access to a software-based tool of interest. The input indicates a support issue encountered. The support issue might include a software-based tool of interest not functioning as expected or not functioning at all, slowness, etc. The cause behind the support issue may or may not be known at the time of the reporting (e.g., it may or may not be known that a server is down, code has been compromised by a hacker, etc.). Other details about the support issue are captured and may include, for example, the time and/or date of the issue and/or report, an identifier of the reporter, etc.

The ticket system 102 may be external from the ticket processing and test generation system 104 in certain example embodiments, in which case the extractor 202 may connect to the ticket system 102, e.g., via application programming interface (API) calls or the like. In other cases, the ticket system 102 may be a part of the ticket processing and test generation system 104. The extractor 202 accesses the support incident report and generates output about it, e.g., in an unstructured or structured format like JSON, XML, or the like. For instance, the extractor 202 may generate output in the following example JSON format:

```
{"title":"<overview of the incident>", "summary":"<summary of the
   incident>", "product":"<affected product>",
   "component":"<affected product module/area>",
   "category":"<category of the incident>"}
```

In certain example embodiments, the extractor 202 may implement code written in Python or another language. Python or other code may be used to help extract details from tickets, analyze extracted details, format output, and/or the like.

Parts (or elements) of or used by the software-based tool of interest are identified and stored to a data store of the ticket processing and test generation system 104. Effectively, a list may be maintained to include, for example, the product, components, and sub-components of the software-based tool of interest. These parts (or elements) may be built into the software-based tool of interest (e.g., part of its codebase), or separate from it (e.g., external data sources, remote code executed by the software-based tool of interest, other features accessed by an API, etc.).

In addition to extracting the products and/or components (the elements) implicated by the support incident report, the extractor 202 also categorizes the underlying support incident into one or more categories. These categories are defined and may include, for example, functionality, integration, performance, etc.

Once these details are extracted, they are stored to a support incident overview storage data store 204. The support incident overview storage data store 204 may include a data structure such as, for example a structured text file, spreadsheet, database table, and/or the like.

Support incident analysis performed by the extractor 202 may include programming techniques such as comparing keywords and/or the like. Doing so may be particularly useful for identifying a product and/or component, as well as a category. In certain example embodiments, the extractor 202 additionally or alternatively may leverage generative AI technology to identify these and/or other aspects to be stored in the support incident overview storage data store 204. An AI model may be trained on past support incidents. For example, past support incidents may be used to help the AI model learn product, component, and sub-component names. Past support incidents may be used to help the AI model learn how to extract category-level information, e.g., based on more natural language/human-understandable reports of problems. In certain example embodiments, lists of product, component, and sub-component names; categories; etc., may be provided to help train the model. The support incident report may be queried using a generative AI prompt to identify these and/or other aspects of the underlying support incident. For instance, it will be appreciated that the extractor 202 and/or the test case generator 206 (described in greater detail below) may use summary information extracted from the support incident report to generate a suitable title, e.g., by feeding at least this summary information to a generative AI model with a prompt. The output from the AI prompt may be formatted or reformatted by the extractor 202 for storage in the support incident overview storage data store 204.

Example Test Case Generator

Based on the example support incident extraction and analysis described above, a new test case is generated via a test case generator 206. The test case generator 206 may leverage generative AI to generate the new test case. For example, the test case generator 206 may be trained to generate test cases in terms of servers to be pinged, acceptable response times, input and expected output, etc. The generative AI model can be provided with prompts, via which it is asked to generate a proper test case based on data stored to the support incident overview data store.

A test comparator 208 compares the new test case generated by the test case generator 206 against tests stored to a test repository 210 to determine whether the test repository 210 already includes any tests matching the newly-generated test case. If no matching test is found, then the test repository 210 is updated with this newly-generated test case.

In certain example embodiments, the comparator 208 uses title and summary information to compare the newly-generated test case against the tests in the test repository 210. A match at or above a certain threshold (e.g., 70%) is considered to be the same test and, thus, the test repository 210 is not updated. If the match is below that threshold, then the test repository 210 is updated. The following pseudo-code may be leveraged for comparing and conditional updating of the test repository 210:

```
If (TESTGENERATOR_TEST <= 70% of TESTBED_TEST) then
   SKIP_UPDATING_TESTBED
Else
   UpdateTestInTestBed( )
```

Example Test Automation

Once the test is generated and added to test repository 210, that test is passed to an automator block, which is part of an automation suite 212. The automation suite 212 in certain example embodiments is able to run test scripts or the like. The automator block generates corresponding automation scripts and stores them in a repository, e.g., with a support incident identifier associated with these scripts. The automator block uses a generative AI model to generate the automation scripts. The generative AI model may be trained on tests written by test code developers, quality assurance specialists, and/or others. The generative AI model may, for example, generate Selenium automation scripts. As is known, Selenium is an open source software suite of browser automation tools that automate web browser interactions, created for testing purposes. If a custom or dedicated automation framework is used in connection with the automation suite 212, then manual effort may or may not be needed to automate the scripts. For example, the generative AI model may be trained to produce scripts that comply with standards of the custom or dedicated automation framework.

Example Developer Fixes

A developer may uses information from the summary generated by extractor 202 and stored to the support incident overview store 204 to gather information about, and set out to, resolve the issue underlying the support issue. The fixes are committed to a developer fix repository 214, which includes a plurality of commits. The developer may be asked or required to commit a fix together with a support incident identifier.

Example Fetching of Related Automation Tests, and Test Execution

Once the developer commits a fix (e.g., with a support incident identifier), certain example embodiments fetch one or more corresponding automated tests. The obtaining of the associated test(s) may be facilitated because the fixes and the automation scripts both may have support incident identifiers associated therewith. In other cases, fetching may be manual, based on title or other information, etc. Tags for these and/or other attributes may be provided automatically, or by developers for fixes and/or others for the tests. The related test(s) 216 is/are then executed via a test execution module 218 of the test platform 106.

The following pseudocode may be used to retrieve and execute tests:

```
SIList = fetchSupportIncidentDetails( )
Loop for each SI in SIList
    JSONOUT= analyseSI(SI)
    TESTGENERATOR_TEST = generateTest(JSONOUT)
    TESTBED_TEST_LIST=getTestDetailsFromTestBed( )
        Loop for each TESTBED_TEST in TESTBED_TEST_LIST
        //compare Test generator testcase against the testbed and
        update the testbed if no matching test found(70% similarity)
            If (TESTGENERATOR_TEST <= 70% of TESTBED_TEST) then
                SKIP_UPDATING_TESTBED
            Else
                UpdateTestInTestBed(SI_Number)
                GenerateAutomationScript(SI_Number)
On_Developer_Fix(SI_Number):
        Fetch_Related_AutomationScripts( )
        ExecuteTestScripts( )
```

Those skilled in the art will appreciate that the entire process of ingesting and analyzing support incident tickets, powered by generative AI models, can improve the test generation and fix verification process. Doing so can lead to more consistent and objectively generated tests that learn over time in an organized manner.

Example

FIG. 3 is a flowchart showing a process for support incident analysis used in connection with certain example embodiments. Start point A corresponds to a new support incident report being received. It will be appreciated that the FIG. 3 flowchart may involve multiple support incidents. In step S302, details regarding the support incident ticket are fetched. This may include an identifier of the ticket, which may be a numeric, alphanumeric, or other identifier (e.g., SI-497150). Details about the ticket are summarized in step S304. In this example, summary information includes the following:

(1) Hardcode the values for different types of variables (int, string, Boolean, date, etc.) in the flow service (2) Verify whether the output produced on run/debug of the flow service is as expected. XML output should not be produced.

In step S306, information is extracted regarding the issue category, implicated module, etc. In this example, the issue category is functional, and the module is FlowService. In step S308, the test case is generated. The test case in this example is as follows:

Title: Verify the output on running the FlowService with hardcoded values

Steps:

(1) Hardcode the FlowService with values.

(2) Run the FlowService.

(3) Verify the output is in proper format.

A determination is made in step S310 as to whether a test corresponding to the test case generated in step S308 is already present in the test repository 210. If not, then the test repository is updated in step S312 with the test case generated in step S308. A generative AI model helps generate an automation script in step S314 based on the generated test, and the automation script is added to the automation suite repository 220.

Start point B involves a developer fix being committed. When the developer fix is committed in step S316, one or more scripts related to the fix is/are retrieved in step S318 from the automation suite 220. The script(s) is/are executed in step S330.

The generative AI models of certain example embodiments are trained with existing ticket details, tests from the test repository, and/or other sources of reliable information.

These other sources of reliable information may include, for example, knowledgebase articles about support issues and/pr fixes, developer notes about problems and resolutions, notes regarding system availability, etc. FIGS. 4A-4B provide a code snippet that may be used for extracting support incident data, creating a new entry, and storing the newly-created entry to a database, in accordance with certain example embodiments. In the FIGS. 4A-4B example, a Chroma database is used to store an OpenAI embedding. It will be appreciated that these are just examples, and that other implementations may use other types of entries in connection with other types of databases.

FIG. 5 is a code snippet relevant to analyzing support incidents in connection with certain example embodiments. That is, FIG. 5 helps define an example prompt used in analyzing support incidents. In certain example embodiments, existing AI models may be used to generate test cases, test scripts, etc., with appropriate prompts. An example prompt may be as follows:

"Assume you are an expert in webMethods customer support incident analysis. Please give me appropriate test cases based on the summary."

"Assume you have a good experience on Selenium Web-Driver automation. Kindly provide me the ready to consume selenium WebDriver code for the {testcase}."

Although certain example embodiments are described in connection with multiple generative AI models for different components, it will be appreciated that fewer (and potentially even one) multi-purpose generative AI model may be trained to handle requests from various components including, for example, the extractor 202, the test case generator 206, and/or the automator.

Further, although certain example embodiments are described as implementing test scripts, it will be appreciated that other kinds of tests may be used together with, or in place of, scripts, in different example embodiments. These tests may include custom hooks, executables, record-and-playback features, and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A test generation system, comprising:
an electronic interface to a ticket system; and
at least one processor configured to perform operations comprising:
  extracting information from a support incident report related to an underlying support incident reported via the ticket system, the extracted information including one or more elements of a computer-implemented product implicated by the underlying support incident and a category of the support incident;
  generating a test case based on the extracted information; and
  generating a new test based on the test case using a generative artificial intelligence (AI) model and storing the generated new test to the test repository;
  wherein responsive to a developer fix being committed, one or more tests relevant to the developer fix is/are automatically identified and automatically executed.

2. The system of claim 1, wherein the at least one processor is further configured to determine whether a test matching the generated test case already exists in a test repository, and
  wherein the new test is generated responsive to a determination that there is no test matching the generated test case already existing in the test repository.

3. The system of claim 2, wherein the determination of whether a test matching the generated test case already exists in a test repository is based on a comparison of titles and summaries of the generated test case and the tests in the test repository.

4. The system of claim 1, wherein the ticket system is user-facing and external to the test generation system.

5. The system of claim 1, wherein the one or more elements of the computer-implemented product include(s) a component or sub-component of the computer-implemented product.

6. The system of claim 1, wherein the category is selected from a list comprising at least two of: functionality, integration, performance, reliability, user interface and/or user experience, infrastructure, and configuration.

7. The system of claim 1, wherein the new test is generated as an automation script.

8. The system of claim 7, wherein the automation script is executable in an external test platform.

9. The system of claim 1, wherein the new test, developer fix, and support incident report each have a common identifier associated therewith.

10. A test generation method, comprising:
extracting information from a support incident report related to an underlying support incident reported via a ticket system, the extracted information including one or more elements of a computer-implemented product implicated by the underlying support incident and a category of the support incident;
generating a test case based on the extracted information; and
generating a new test based on the test case using a generative artificial intelligence (AI) model and storing the generated new test to the test repository;
wherein responsive to a developer fix being committed, one or more tests relevant to the developer fix is/are automatically identified and automatically executed.

11. The method of claim 10, further comprising determining whether a test matching the generated test case already exists in a test repository,
  wherein the new test is generated responsive to a determination that there is no test matching the generated test case already existing in the test repository.

12. The method of claim 11, wherein the determination of whether a test matching the generated test case already exists in a test repository is based on a comparison of titles and summaries of the generated test case and the tests in the test repository.

13. The method of claim 10, wherein the ticket system is user-facing and external to the test generation system.

14. The method of claim 10, wherein the new test is generated as an automation script.

15. The method of claim 14, wherein the automation script is executable in an external test platform.

16. The method of claim 10, wherein the new test, developer fix, and support incident report each have a common identifier associated therewith.

17. A non-transitory computer readable storage medium storing instructions that, when executed, cause a processor to perform operations corresponding to the method of claim 10.

18. A developer environment, comprising:
a repository storing code commits; and
at least one processor configured to perform operations comprising:
  receiving information extracted from a support incident report related to an underlying support incident reported via a ticket system, the extracted information including one or more elements of a computer-implemented product implicated by the underlying support incident and a category of the support incident;
  enabling a developer to write and commit code related to the underlying support incident; and
  responsive to new code being committed, one or more tests relevant to the new code being committed is/are automatically identified from a test repository and are automatically executed;
  wherein the test repository is populated by at least some predefined tests and at least some other tests derived from support incident reports.

19. The developer environment of claim 18, wherein the ticket system is user-facing and external to the test generation system.

20. The developer environment of claim 18, wherein the new code being committed has an identifier based on the underlying support incident to which it is related, and wherein the one or more tests relevant to the new code being committed is/are identified by virtue of sharing that identifier.

21. A method of using the developer environment of claim 18 to write and test code.

22. A non-transitory computer readable storage medium storing instructions that, when executed, cause a processor to perform operations corresponding to the method of claim 21.

\* \* \* \* \*